(12) United States Patent
Matsubara et al.

(10) Patent No.: US 11,305,753 B2
(45) Date of Patent: Apr. 19, 2022

(54) HYBRID VEHICLE

(71) Applicant: TOYOTA JIDOSHA KABUSHIKI KAISHA, Toyota (JP)

(72) Inventors: Keigo Matsubara, Nagoya (JP); Ayumu Sagawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 370 days.

(21) Appl. No.: 16/676,494

(22) Filed: Nov. 7, 2019

(65) Prior Publication Data

US 2020/0189565 A1 Jun. 18, 2020

(30) Foreign Application Priority Data

Dec. 12, 2018 (JP) .............................. JP2018-232238

(51) Int. Cl.
| | |
|---|---|
| *B60W 20/40* | (2016.01) |
| *B60K 17/02* | (2006.01) |
| *B60W 10/08* | (2006.01) |
| *B60W 10/06* | (2006.01) |
| *B60W 10/02* | (2006.01) |

(52) U.S. Cl.
CPC ............. *B60W 20/40* (2013.01); *B60K 17/02* (2013.01); *B60W 10/02* (2013.01); *B60W 10/06* (2013.01); *B60W 10/08* (2013.01)

(58) Field of Classification Search
CPC ...... B60W 20/40; B60W 10/02; B60W 10/06; B60W 10/08; B60W 20/17; B60W 30/192; B60W 30/20; B60W 2030/203; B60W 2510/1075; F16D 2500/50227; B60K 17/02

See application file for complete search history.

(56) References Cited

U.S. PATENT DOCUMENTS

| 5,562,125 | A * | 10/1996 | Bray | ................... | B60T 13/686 137/625.64 |
|---|---|---|---|---|---|
| 9,382,953 | B2 * | 7/2016 | Kuwahara | ............... | F16D 25/14 |
| 2008/0071437 | A1 * | 3/2008 | Hirata | .................. | B60W 20/40 701/22 |
| 2009/0312895 | A1 * | 12/2009 | Kim | ...................... | B60W 20/00 701/22 |
| 2010/0075798 | A1 * | 3/2010 | Suzuki | ................. | B60W 20/40 477/5 |

(Continued)

FOREIGN PATENT DOCUMENTS

JP 2011-213310 A 10/2011

*Primary Examiner* — Richard W Ridley
*Assistant Examiner* — Aimee Tran Nguyen
(74) *Attorney, Agent, or Firm* — Oblon, McClelland, Maier & Neustadt, L.L.P.

(57) ABSTRACT

A hybrid vehicle includes an engine, a switching valve, and an electronic control unit. The electronic control unit configured to perform switching from the engine travel mode to the EV travel mode through a first stage to start the filling control when it is determined that the possibility is high that the engine stop condition will be established afterwards while the engine travel mode is selected, a second stage to start the clutch release control by switching the switching valve to the second state in response to establishment of the engine stop condition, and a third stage to stop operation of the engine after completion of the clutch release control.

5 Claims, 6 Drawing Sheets

(56) References Cited

U.S. PATENT DOCUMENTS

| | | | |
|---|---|---|---|
| 2013/0304293 A1* | 11/2013 | Yoshikawa | B60W 10/02 701/22 |
| 2015/0032358 A1* | 1/2015 | Amemiya | B60L 15/2054 701/104 |
| 2015/0353075 A1* | 12/2015 | Futatsudera | B60W 10/26 701/22 |
| 2020/0189560 A1* | 6/2020 | Matsubara | B60K 6/48 |

* cited by examiner

HYBRID VEHICLE

INCORPORATION BY REFERENCE

The disclosure of Japanese Patent Application No. 2018-232238 filed on Dec. 12, 2018 including the specification, drawings and abstract is incorporated herein by reference in its entirety.

BACKGROUND

1. Technical Field

The present disclosure relates to a hybrid vehicle including a clutch disposed between an engine and a motor.

2. Description of Related Art

Japanese Unexamined Patent Application Publication No. 2011-213310 (JP 2011-213310 A) discloses a hybrid vehicle including a motor provided in a power transmission path from an engine to wheels, and a clutch provided between the engine and the motor in the power transmission path. The hybrid vehicle disclosed in JP 2011-213310 A is configured to switch between EV travel in which the power of the motor is transmitted to the wheels to run the vehicle in the state where the clutch is released and the engine is stopped, and engine travel in which the power of the engine is transmitted to the wheels to run the vehicle in the state where the clutch is engaged.

SUMMARY

When the clutch is released fast in the engine travel, the engine speed increases rapidly or a torque shock occurs so that the drivability is deteriorated. Therefore, it is desirable that the release of the clutch when switching from the engine travel to the EV travel be performed moderately while gradually decreasing an engagement force of the clutch. On the other hand, in order to quickly shift from the engine travel to the EV travel, the release of the clutch should be performed in a short time.

In the meantime, the gradual decrease of the engagement force when releasing the clutch as described above can be achieved by employing, as a control valve of the clutch oil pressure, not an on-off switching valve that switches between supplying the oil pressure and stopping the supply of the oil pressure in a binary manner, but a pressure regulating valve such as a linear solenoid valve that can regulate the oil pressure. However, the operation of the pressure regulating valve requires greater electric power than in the case of the on-off switching valve. Therefore, when the clutch oil pressure is controlled solely by the pressure regulating valve, the electricity consumption becomes large.

An aspect of the present disclosure relates to a hybrid vehicle including an engine, a motor, a clutch, an oil pressure generator, a pressure regulating valve, a first oil passage, a second oil passage, a switching valve, and an electronic control unit. The motor is provided in a power transmission path from the engine to a wheel. The clutch is provided between the engine and the motor in the power transmission path. The oil pressure generator is configured to generate a clutch engagement oil pressure. The pressure regulating valve is configured to apply pressure regulation to the clutch engagement oil pressure according to an electric power supply amount and output an oil pressure regulated, and configured to stop output of the oil pressure in response to a stoppage of electric power supply. The first oil passage serves as an oil passage for supplying the clutch engagement oil pressure generated by the oil pressure generator to the clutch. The second oil passage serves as an oil passage for supplying the oil pressure output by the pressure regulating valve to the clutch. The switching valve is configured to switch between a first state to connect the first oil passage to the clutch and interrupt connection of the second oil passage to the clutch, and a second state to connect the second oil passage to the clutch and interrupt connection of the first oil passage to the clutch. The electronic control unit is configured to perform travel control of the hybrid vehicle by selecting one travel mode from a plurality of travel modes including an engine travel mode in which the hybrid vehicle travels by transmitting power of the engine to the wheel, and an EV travel mode in which the hybrid vehicle travels by power of the motor in a state where the engine is stopped. The electronic control unit is configured to switch the travel mode to the EV travel mode when a predetermined engine stop condition is established while the engine travel mode is selected. The electronic control unit is configured to, while the EV travel mode is selected, maintain a released state of the clutch by setting the switching valve to the second state in a state where electric power supply to the pressure regulating valve is stopped, and configured to, while the engine travel mode is selected, maintain an engaged state of the clutch by setting the switching valve to the first state in a state where electric power supply to the pressure regulating valve is stopped. The electronic control unit is configured to determine whether or not, although the engine stop condition is currently not established, a possibility is high that the engine stop condition will be established afterwards. The electronic control unit is configured to perform filling control to supply electric power to the pressure regulating valve to increase the oil pressure in the second oil passage in a state where the switching valve is set to the first state. The electronic control unit is configured to perform clutch release control to release the clutch while performing oil pressure control by the pressure regulating valve in a state where the switching valve is set to the second state. The electronic control unit is configured to perform switching from the engine travel mode to the EV travel mode through a first stage to start the filling control when it is determined that the possibility is high that the engine stop condition will be established afterwards while the engine travel mode is selected, a second stage to start the clutch release control by switching the switching valve to the second state in response to establishment of the engine stop condition, and a third stage to stop operation of the engine after completion of the clutch release control.

With the hybrid vehicle according to the aspect of the present disclosure, when the switching valve is set to the first state to connect the clutch to the first oil passage in the state where the electric power supply to the pressure regulating valve is stopped, the clutch engagement oil pressure is supplied to the clutch through the first oil passage. On the other hand, when the switching valve is set to the second state to connect the clutch to the second oil passage in the state where the electric power supply to the pressure regulating valve is stopped, the oil pressure supply to the clutch is stopped. Consequently, in the hybrid vehicle described above, maintaining the engagement of the clutch while the engine travel mode is selected and maintaining the release of the clutch while the EV travel mode is selected are both performed in the state where the electric power supply to the pressure regulating valve is stopped. On the other hand, when the electric power supply to the pressure regulating valve is performed in the state where the switching valve is set to the second state to connect the clutch to the second oil passage, the oil pressure regulated by the pressure regulating valve is supplied to the clutch. Therefore, although the control of the supply oil pressure to the clutch (hereinafter referred to as a "clutch oil pressure") by the pressure regulating valve is performed at the time of switching transition of the travel mode, it is possible to stop the electric power supply to the pressure regulating valve, of which operating electric power is greater than that of the switching valve, while the engine travel mode or the EV travel mode is selected, and therefore, the electricity consumption can be suppressed.

In the hybrid vehicle thus configured, the clutch engagement oil pressure is supplied to the clutch through the first oil passage while the engine travel mode is selected. On the other hand, in this state, the electric power supply to the pressure regulating valve is stopped so that the second oil passage is in a state where the oil pressure is lost. Even by starting the electric power supply to the pressure regulating valve in this state, the oil pressure in the second oil passage is not increased immediately. Therefore, when, in order to control the clutch oil pressure at the time of switching from the engine travel mode to the EV travel mode in response to establishment of the engine stop condition, the electric power supply to the pressure regulating valve is started and the switching valve is switched to the second state to connect the second oil passage to the clutch, the clutch oil pressure rapidly decreases immediately thereafter. As a result, the engagement force of the clutch decreases and therefore the load of the engine decreases, leading to a rapid increase in the engine speed, and further, since the power of the engine cannot be fully transmitted to the wheel due to the decrease in the engagement force, there is a possibility of the occurrence of a torque shock.

In this regard, in the hybrid vehicle described above, the establishment of the engine stop condition is predicted in advance. When it is determined that the possibility is high that the engine stop condition will be established afterwards, the filling control to supply the electric power to the pressure regulating valve is started while maintaining the switching valve in the first state. During the filling control, the oil pressure is introduced into the second oil passage in the state where the clutch engagement oil pressure is supplied to the clutch through the first oil passage. Therefore, when the engine stop condition is established afterwards, the second oil passage is in a pressure-increased state so that even when the second oil passage is connected to the clutch in response to the establishment of the engine stop condition, the clutch oil pressure does not decrease rapidly. Note that since the filling control in this event is performed before the establishment of the engine stop condition, the implementation of the filling control does not cause a delay in the completion of switching to the EV travel mode.

In the case where the engine stop condition is established in a short time after it is determined that the possibility is high that the engine stop condition will be established afterwards, there are cases where, even by starting the filling control when it is determined that the possibility is high that the engine stop condition will be established afterwards, the second oil passage cannot be fully increased in pressure until the establishment of the engine stop condition. In such a case, when the second oil passage is connected to the clutch in response to the establishment of the engine stop condition, there are cases where it is not possible to fully suppress a decrease in the clutch oil pressure. In view of this, the electronic control unit in the hybrid vehicle described above may be configured to, when the engine stop condition is established before the pressure increase of the second oil passage by the filling control is completed, delay the start of the clutch release control in the second stage until the pressure increase of the second oil passage is completed. Consequently, the second oil passage is connected to the clutch after the completion of the pressure increase even in such a case.

In the hybrid vehicle according to the aspect of the present disclosure, the electronic control unit may be configured to, when the clutch release control is started in the second stage, start torque replacement control to increase motor torque while decreasing shaft torque of the engine. With the hybrid vehicle thus configured, the motor torque is increased in parallel to decreasing the shaft torque of the engine toward the operation stop so that the driving force of the vehicle can be maintained even during switching of the travel mode.

Since it is difficult to perfectly predict whether or not the possibility is high that the engine stop condition will be established afterwards, there are cases where, according to the situation, the engine stop condition is established before the prediction is made. Therefore, in the hybrid vehicle according to the aspect of the present disclosure, the electronic control unit may be configured to, when the engine stop condition is established in a state where it is not determined that the possibility is high that the engine stop condition will be established afterwards while the engine travel mode is selected, perform switching from the engine travel mode to the EV travel mode through a fourth stage to start the filling control in response to establishment of the engine stop condition, a fifth stage to start the clutch release control by switching the switching valve to the second state in response to completion of the pressure increase of the second oil passage by the filling control, and a sixth stage to stop operation of the engine after completion of the clutch release control. With the hybrid vehicle thus configured, even when the establishment of the engine stop condition cannot be predicted in advance, it is possible to suppress a rapid decrease in the clutch oil pressure when the clutch is connected to the second oil passage for controlling the clutch oil pressure by the pressure regulating valve.

In the hybrid vehicle according to the aspect of the present disclosure, the electronic control unit may be configured to, when a predetermined engine start condition is established while the EV travel mode is selected, perform start control to start the engine in a state where the switching valve is set to the second state and electric power is supplied to the pressure regulating valve. While performing the start control in such a case, the oil pressure is supplied from the pressure regulating valve to the second oil passage. Therefore, the electronic control unit when performing such start control may be configured to, when the engine stop condition is established while performing the start control, start the clutch release control in response to the establishment of the engine stop condition.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Figure 1:
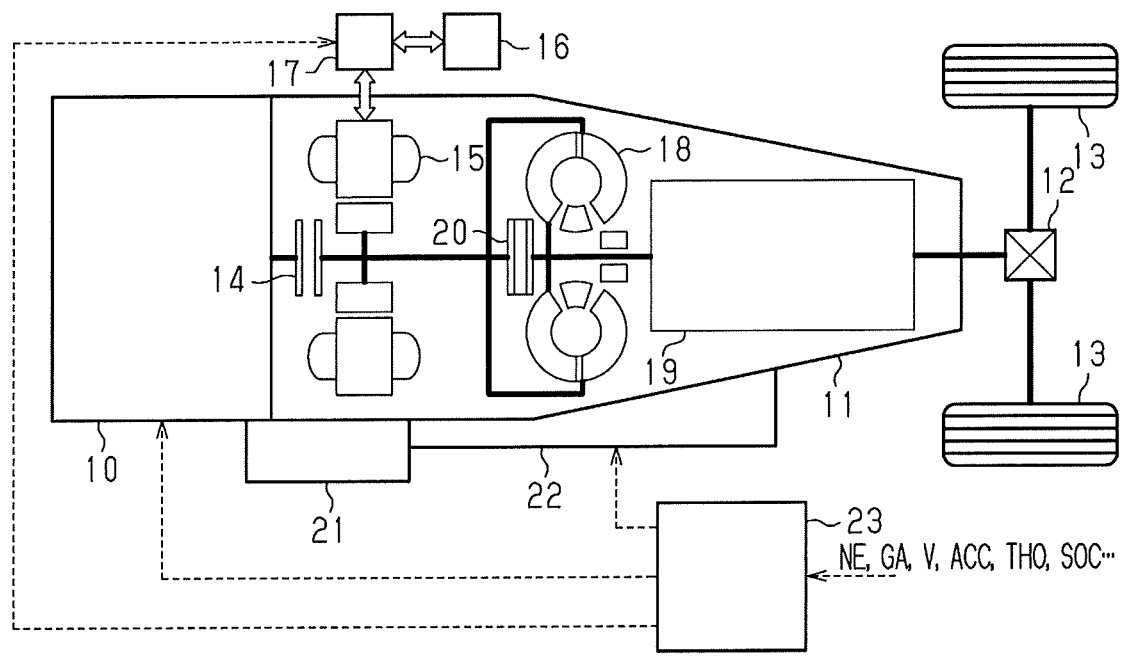
FIG. 1 is a schematic diagram illustrating the configuration of a drive system of a hybrid vehicle of an embodiment.

Hereinafter, an embodiment of a hybrid vehicle will be described in detail with reference to FIGS. 1 to 9. First, referring to FIG. 1, the configuration of a drive system of the hybrid vehicle of this embodiment will be described. As illustrated in FIG. 1, a speed change unit 11 is provided in a power transmission path from an engine 10 to wheels 13 in the hybrid vehicle. The speed change unit 11 and the right and left wheels 13 are operatively coupled to each other via a differential 12.

The speed change unit 11 includes a clutch 14 and a motor 15. In the speed change unit 11, the motor 15 is disposed so as to be located in the power transmission path from the engine 10 to the wheels 13. The clutch 14 is disposed so as to be located between the engine 10 and the motor 15 in the power transmission path. The clutch 14 is engaged when supplied with the oil pressure, and allows power transmission between the engine 10 and the motor 15. The clutch 14 is released when the supply of the oil pressure is stopped, and interrupts power transmission between the engine 10 and the motor 15.

The motor 15 is connected to an in-vehicle power supply 16 via an inverter 17. The motor 15 functions as an electric motor to generate a driving force of the vehicle according to a supply of electric power from the in-vehicle power supply 16 and functions as an electric power generator to generate electric power to be charged into the in-vehicle power supply 16 according to power transmission from the engine 10 or the wheels 13. Electric power that is given and received between the motor 15 and the in-vehicle power supply 16 is regulated by the inverter 17.

The speed change unit 11 further includes a torque converter 18 serving as a fluid coupling having a torque amplification function, and a gear-type multi-stage transmission 19 that allows the speed ratio to be switched in multiple stages by switching the gear stage. In the speed change unit 11, the gear-type multi-stage transmission 19 is disposed so as to be located closer to the wheel 13 side than the motor 15 in the power transmission path. The motor 15 and the gear-type multi-stage transmission 19 are coupled to each other via the torque converter 18. The torque converter 18 is provided with a lock-up clutch 20 that is engaged when supplied with the oil pressure, thereby directly coupling the motor 15 and the gear-type multi-stage transmission 19 to each other.

The speed change unit 11 further includes an oil pump 21 and an oil pressure control unit 22. The oil pressure generated by the oil pump 21 is supplied to the clutch 14, the torque converter 18, the gear-type multi-stage transmission 19, and the lock-up clutch 20 via the oil pressure control unit 22. The oil pressure control unit 22 includes oil pressure circuits of the clutch 14, the torque converter 18, the gear-type multi-stage transmission 19, and the lock-up clutch 20 and various oil pressure control valves for respectively controlling the hydraulic oil pressures of the oil pressure circuits.

In addition, the hybrid vehicle includes a vehicle control unit 23. The vehicle control unit 23 is configured as an electronic control unit including an arithmetic processing circuit that performs various arithmetic processes relating to travel control of the vehicle, and a storage device storing control programs and data. Detection signals such as a rotational speed of the engine 10 (engine speed NE), an intake air amount GA of the engine 10, a travel speed V of the vehicle, an accelerator operation amount ACC, a temperature of hydraulic oil (oil temperature THO) of the speed change unit 11, and a state of charge SOC of the in-vehicle power supply 16 are input to the vehicle control unit 23. The vehicle control unit 23 performs travel control of the vehicle based on those detection signals. The travel control of the vehicle referred to herein includes control of operating conditions (intake air amount and fuel injection amount) of the engine 10 and control of power running torque or regenerative torque of the motor 15 through regulation of the electric power amount, given and received between the motor 15 and the in-vehicle power supply 16, by the inverter 17. The travel control of the vehicle further includes operation control of the clutch 14, the torque converter 18, the gear-type multi-stage transmission 19, and the lock-up clutch 20 through drive control of the oil pressure control valves of the oil pressure control unit 22.

Figure 2:
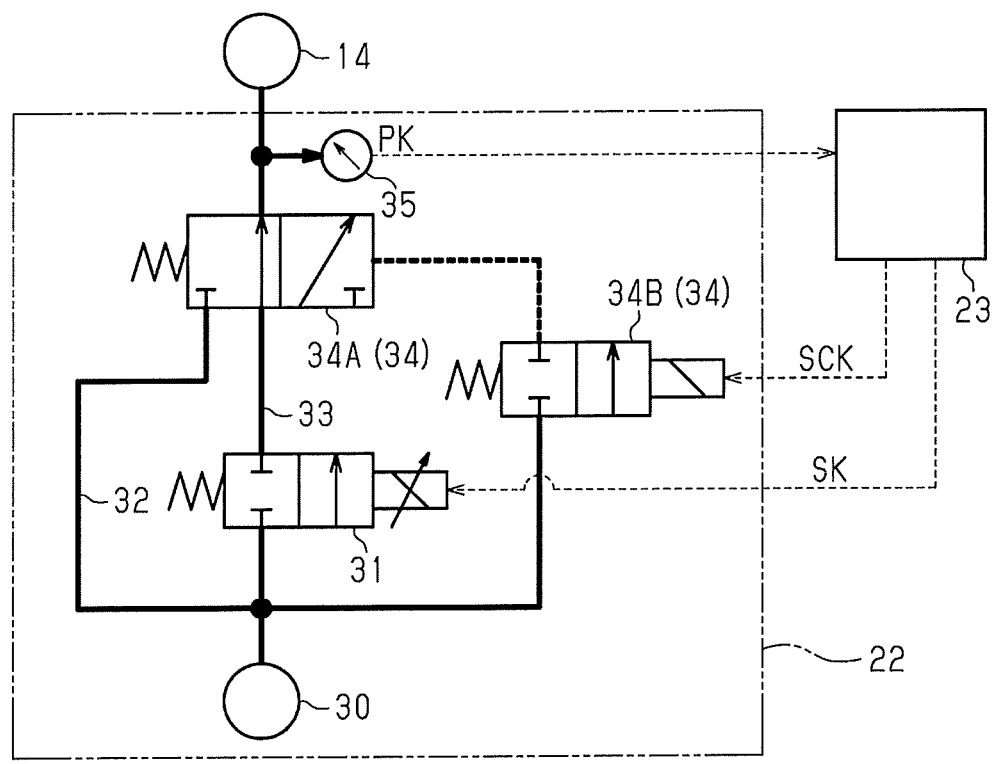
FIG. 2 is a diagram illustrating the configuration of an oil pressure circuit of a clutch in the hybrid vehicle.

FIG. 2 illustrates the configuration of the oil pressure circuit of the clutch 14 in the oil pressure control unit 22. An oil pressure generator 30 illustrated in FIG. 2 regulates the pressure of oil delivered by the oil pump 21 at a predetermined line pressure PL and outputs the regulated oil pressure. As illustrated in FIG. 2, the oil pressure circuit of the clutch 14 includes a pressure regulating valve 31. The pressure regulating valve 31 is a linear solenoid valve configured to apply pressure regulation to the line pressure PL according to an electric power supply amount and output an oil pressure regulated, and configured to stop the output of the oil pressure in response to a stoppage of electric power supply. An oil pressure supply path of the clutch 14 includes two oil passages, i.e. a first oil passage 32 serving as an oil passage for supplying the line pressure PL generated by the oil pressure generator 30 directly to the clutch 14, and a second oil passage 33 serving as an oil passage for supplying the oil pressure output by the pressure regulating valve 31 to the clutch 14.

The oil pressure circuit of the clutch 14 further includes a switching valve 34 that switches the oil passage, to be connected to the clutch 14, between the first oil passage 32 and the second oil passage 33. The switching valve 34 is configured as a pilot type solenoid valve having an oil passage switching part 34A and a solenoid part 34B. The solenoid part 34B supplies the line pressure PL to the oil passage switching part 34A in response to a supply of electric power and stops the supply of the line pressure PL to the oil passage switching part 34A in response to a stoppage of the supply of electric power. While the line pressure PL is supplied from the solenoid part 34B, the oil passage switching part 34A connects the first oil passage 32 to the clutch 14 and interrupts the connection of the second oil passage 33 to the clutch 14 (hereinafter, this state will be referred to as a "first state"). While the supply of the line pressure PL from the solenoid part 34B is stopped, the oil passage switching part 34A connects the second oil passage 33 to the clutch 14 and interrupts the connection of the first oil passage 32 to the clutch 14 (hereinafter, this state will be referred to as a "second state"). The oil pressure circuit of the clutch 14 further includes an oil pressure sensor 35 that detects the oil pressure supplied from the oil passage switching part 34A to the clutch 14.

The vehicle control unit 23 outputs a switching valve drive signal SCK to the solenoid part 34B of the switching valve 34. A state where the switching valve drive signal SCK is ON corresponds to a state where electric power is supplied to the solenoid part 34B, and a state where the switching valve drive signal SCK is OFF corresponds to a state where the supply of electric power to the solenoid part 34B is stopped. The vehicle control unit 23 controls an electric power supply amount SK to the pressure regulating valve 31 so that the oil pressure that is output from the pressure regulating valve 31 to the second oil passage 33 is variable within a range from zero to the line pressure PL. Specifically, the vehicle control unit 23 sets a value of a pressure regulating valve command pressure PSK within the range from zero to the line pressure PL. Then, the vehicle control unit 23 calculates an electric power supply amount SK to the pressure regulating valve 31 that can achieve an oil pressure output corresponding to the pressure regulating valve command pressure PSK, and supplies the calculated electric power supply amount SK to the pressure regulating valve 31. When the pressure regulating valve command pressure PSK is zero, i.e. when stopping the oil pressure output of the pressure regulating valve 31, the vehicle control unit 23 sets the electric power supply amount SK to the pressure regulating valve 31 to zero, i.e. stops the supply of electric power to the pressure regulating valve 31. The higher the pressure regulating valve command pressure PSK, the greater the vehicle control unit 23 sets the electric power supply amount SK to the pressure regulating valve 31.

In the hybrid vehicle configured as described above, the vehicle control unit 23 performs travel control of the vehicle by selecting one travel mode from a plurality of travel modes including an EV travel mode in which the vehicle travels by the power of the motor 15 in the state where the engine 10 is stopped, and an engine travel mode in which the vehicle travels by transmitting the power of the engine 10 to the wheels 13. In the following description, details of control of the vehicle control unit 23 relating to switching of the travel mode between the engine travel mode and the EV travel mode will be described.

Figure 3:
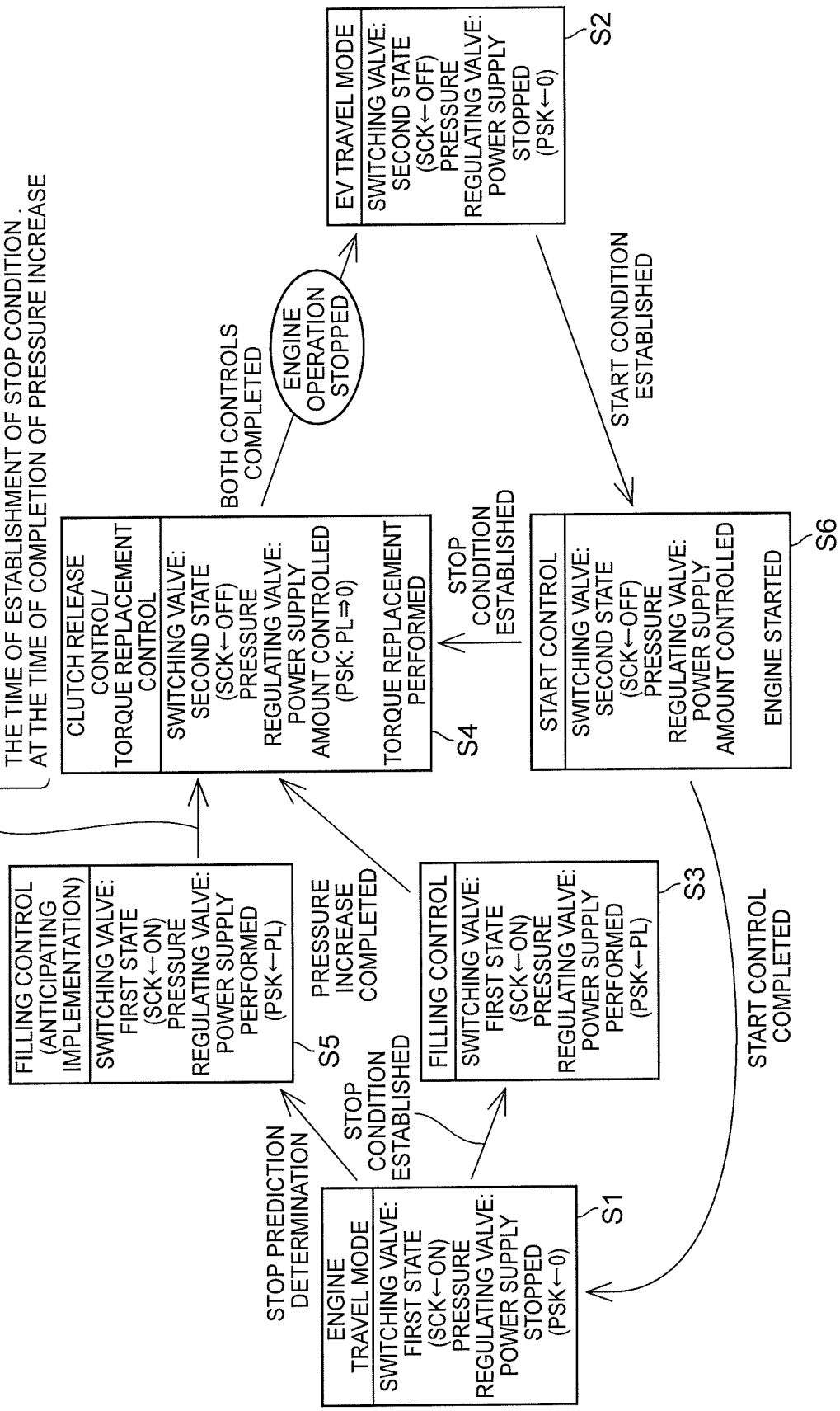
FIG. 3 is a state transition diagram of control of a vehicle control unit relating to switching of a travel mode.
Figure 4:
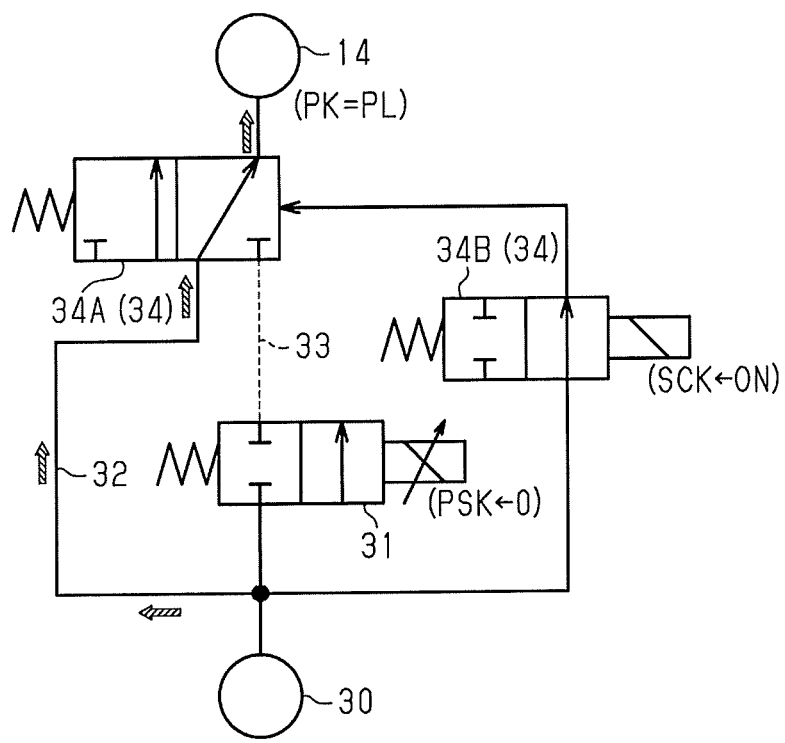
FIG. 4 is a diagram illustrating a state of the oil pressure circuit of the clutch while an engine travel mode is selected.

FIG. 3 illustrates the transition of the control state of the vehicle control unit 23 relating to switching of the travel mode between the engine travel mode and the EV travel mode. As illustrated in FIG. 3, in a control state S1 while the engine travel mode is selected, the vehicle control unit 23 sets the switching valve drive signal SCK to ON and the pressure regulating valve command pressure PSK to zero. As illustrated in FIG. 4, the clutch 14 in this state is connected to the first oil passage 32 and thus supplied with the line pressure PL so as to be engaged. Since the electric power supply is stopped, the pressure regulating valve 31 in this state stops the oil pressure output to the second oil passage 33.

Figure 5:
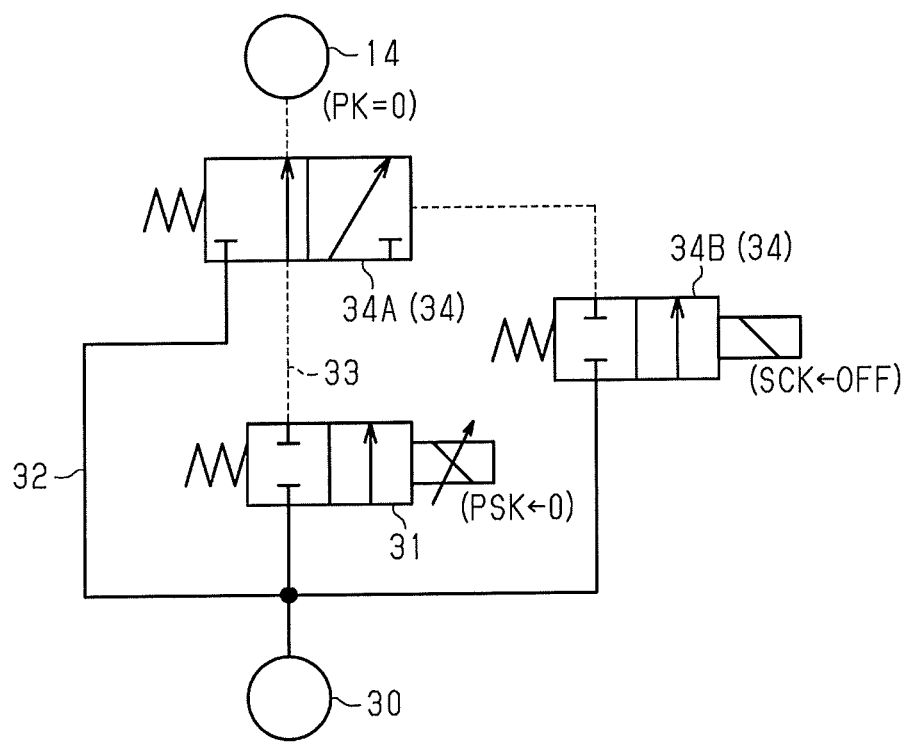
FIG. 5 is a diagram illustrating a state of the oil pressure circuit of the clutch while an EV travel mode is selected.

On the other hand, in a control state S2 while the EV travel mode is selected, the vehicle control unit 23 sets the switching valve drive signal SCK to OFF and the pressure regulating valve command pressure PSK to zero. As illustrated in FIG. 5, the clutch 14 in this state is connected to the second oil passage 33. Since the electric power supply is stopped, the pressure regulating valve 31 in this state stops the oil pressure output to the second oil passage 33. Therefore, the oil pressure supply to the clutch 14 is stopped so that the clutch 14 in this state is released.

When a predetermined engine stop condition is established while the engine travel mode is selected, the vehicle control unit 23 switches the travel mode to the EV travel mode. When a predetermined engine start condition is established while the EV travel mode is selected, the vehicle control unit 23 switches the travel mode to the engine travel mode. Whether or not the engine stop condition or the engine start condition is established is determined based on a required driving force of the vehicle, a state of charge SOC of the in-vehicle power supply 16, and so on. For example, the engine stop condition is established when a state where the required driving force is small enough so that a driving force corresponding to the required driving force can be generated only by the motor 15 lasts for a predetermined time or more, and further, the state of charge SOC is high enough so that it is not necessary to operate the engine 10 for causing the motor 15 to generate electric power. The engine start condition is established when the required driving force is large enough so that a driving force corresponding to the required driving force cannot be generated only by the motor 15, or when the state of charge SOC is low enough so that it is necessary to cause the motor 15 to generate electric power using the power of the engine 10. The required driving force is calculated based on an accelerator operation amount ACC, a travel speed V of the vehicle, the gear stage of the gear-type multi-stage transmission 19, and so on.

Subsequently, the control of the vehicle control unit 23 relating to switching of the travel mode from the engine travel mode to the EV travel mode will be described. In the hybrid vehicle of this embodiment, the vehicle control unit 23 in the control state S1 for the engine travel mode repeatedly performs a stop prediction process for the engine 10 at a predetermined control period. In the stop prediction process, it is determined whether or not, although the engine stop condition is currently not established, the possibility is high that the engine stop condition will be established afterwards. In the following description, the determination in the stop prediction process that the possibility is high that the engine stop condition will be established afterwards will be referred to as a "stop prediction determination". Whether or not the stop prediction determination is established is determined based on an accelerator operation amount ACC, a travel speed V of the vehicle, location information of the vehicle acquired from a car navigation system, and so on. For example, the stop prediction determination is established when one of the following situations is satisfied.

When the accelerator operation amount ACC is decreased to a predetermined value or less from a state exceeding the predetermined value.

When the travel speed V of the vehicle is a predetermined value or greater.

When the required driving force is decreased to a predetermined value or less from a state exceeding the predetermined value.

When the vehicle is traveling on a downward slope.

When the inter-vehicle distance from a preceding vehicle is decreased to a predetermined value or less.

When the vehicle is located just before approaching a corner of a road.

When the lock-up clutch 20 is in an engaged state.

By performing the stop prediction process described above, it is possible to predict the establishment of the engine stop condition before it is established. However, since the perfect prediction is difficult, there are cases where, according to the situation, the engine stop condition is established in the state where the stop prediction determination is not established. Herein, first, a description will be given of a case where switching from the engine travel mode to the EV travel mode is performed when the engine stop condition is established in the state where the stop prediction determination is not established.

While the engine travel mode is selected, when the engine stop condition is established in the state where the stop prediction determination is not established, the vehicle control unit 23 shifts to a control state S3 for filling control. In the control state S3, filling control to supply electric power to the pressure regulating valve 31 is performed while the switching valve drive signal SCK is kept ON to maintain the switching valve 34 in the first state. The electric power supply to the pressure regulating valve 31 in this state is performed with the line pressure PL being set as a value of the pressure regulating valve command pressure PSK. The filling control in this state is continued until the elapsed time from the start of the filling control reaches a pressure increase required time T that is set as a time necessary for increasing an oil pressure P2 of the second oil passage 33 to the line pressure PL. Note that when the engine stop condition is not established before the filling control is completed, the vehicle control unit 23 sets the pressure regulating valve command pressure PSK to zero, thereby returning the control state to the control state S1 for the engine travel mode.

Since the viscosity of the hydraulic oil of the speed change unit 11 increases as the oil temperature THO decreases, the time required for increasing the oil pressure P2 of the second oil passage 33 to the line pressure PL in the filling control increases as the oil temperature THO decreases. Therefore, in this embodiment, the value of the pressure increase required time T is variably set according to the oil temperature THO so that the pressure increase required time T becomes longer when the oil temperature THO is low than when the oil temperature THO is high.

When the pressure increase of the second oil passage 33 to the line pressure PL by the filling control is completed, the vehicle control unit 23 sets the switching valve 34 to the second state, ends the filling control, and shifts to a control state S4. In the control state S4, clutch release control and torque replacement control are performed in parallel. In the torque replacement control, while gradually decreasing shaft torque of the engine 10, torque generated by the motor 15 (hereinafter referred to as "motor torque") is gradually increased correspondingly so that the shaft torque of the engine 10 is finally made zero while maintaining transmission of a driving force corresponding to the required driving force to the wheels 13. When the shaft torque of the engine 10 becomes small, the engagement force of the clutch 14 necessary for torque transmission corresponding to the shaft torque from the engine 10 to the motor 15 becomes small. In the clutch release control, within a range in which the engagement force of the clutch 14 capable of the torque transmission corresponding to the shaft torque of the engine 10 is ensured, the pressure regulating valve command pressure PSK is decreased from the line pressure PL to zero according to a decrease in the shaft torque of the engine 10 in the torque replacement control. Then, after the shaft torque of the engine 10 becomes zero and the pressure regulating valve command pressure PSK becomes zero so that the clutch release control and the torque replacement control are completed, the vehicle control unit 23 stops the operation of the engine 10 and shifts to the control state S2 for the EV travel mode.

Note that when the engine stop condition is not established while performing the clutch release control and the torque replacement control, the vehicle control unit 23 increases the pressure regulating valve command pressure PSK to the line pressure PL, then sets the switching valve 34 to the first state, and stops the electric power supply to the pressure regulating valve 31, thereby returning the control state to the control state S1 for the engine travel mode.

On the other hand, when the stop prediction determination is established in the state where the engine stop condition is not established, the vehicle control unit 23 shifts to a control state S5 for anticipating implementation of filling control. The anticipating implementation referred to herein refers to performing the filling control in advance based on prediction that the engine stop condition will be established afterwards. In the control state S5, like in the case of the control state S3 described above, the filling control is performed by setting the line pressure PL as a value of the pressure regulating valve command pressure PSK in the state where the switching valve drive signal SCK is kept ON. In the case where the engine stop condition is established before the pressure increase required time T has elapsed from the start of the filling control, the vehicle control unit 23 switches the switching valve 34 to the second state when the pressure increase required time T has elapsed from the start of the filling control, i.e. when the pressure increase of the second oil passage 33 by the filling control is completed, and shifts to the control state S4 described above. On the other hand, in the case where the engine stop condition is established after the pressure increase required time T has elapsed from the start of the filling control, the vehicle control unit 23 switches the switching valve 34 to the second state in response to the establishment of the engine stop condition, and shifts to the control state S4. Note that when the stop prediction determination is not established before the engine stop condition is established in the control state S5, the vehicle control unit 23 sets the pressure regulating valve command pressure PSK to zero to stop the electric power supply to the pressure regulating valve 31, thereby returning the control state to the control state S1 for the engine travel mode.

Also in this case, after shifting to the control state S4, the vehicle control unit 23 performs the clutch release control and the torque replacement control. Then, after the clutch release control and the torque replacement control are completed, the vehicle control unit 23 stops the operation of the engine 10 and shifts to the control state S2 for the EV travel mode.

Subsequently, control relating to switching from the EV travel mode to the engine travel mode will be described. As described above, in the control state S2 for the EV travel mode, the clutch 14 is connected to the second oil passage 33 in the state where the electric power supply to the pressure regulating valve 31 is stopped. When the engine start condition is established while the EV travel mode is selected, the vehicle control unit 23 shifts to a control state S6 for start control. In the control state S6, while maintaining the switching valve 34 in the second state, control of a clutch oil pressure PK for engaging the clutch 14 is performed by the pressure regulating valve 31. The electric power supply amount SK to the pressure regulating valve 31 in this state is controlled so that the clutch 14 generates an engagement force capable of transmitting power necessary for starting the engine 10 from the motor 15 to the engine 10 while transmitting power corresponding to the required driving force from the motor 15 to the wheels 13. The vehicle control unit 23 in this state performs torque control of the motor 15 so as to transmit necessary powers to both the engine 10 and the wheels 13. Then, when the start of the engine 10 is completed, the vehicle control unit 23 increases the pressure regulating valve command pressure PSK to the line pressure PL and then switches the switching valve 34 to the first state. Then, the vehicle control unit 23 stops the electric power supply to the pressure regulating valve 31, thereby shifting to the control state S1 for the engine travel mode. Note that when the engine stop condition is established while the start control is performed, the vehicle control unit 23 shifts to the control state S4 to perform the clutch release control and the torque replacement control and then stops the operation of the engine 10, thereby returning the control state to the control state S2 for the EV travel mode.

The operation and effect of this embodiment described above will be described. The hybrid vehicle of this embodiment is configured such that, in the clutch release control or the start control at the time of switching transition between the engine travel mode and the EV travel mode, switching between the release and engagement of the clutch 14 is performed while controlling the supply oil pressure to the clutch 14 (hereinafter referred to as a "clutch oil pressure PK") by the pressure regulating valve 31. Consequently, the release and engagement of the clutch 14 is smoothly performed so that it is possible to suppress a rapid increase or decrease in the engine speed NE or the occurrence of a torque shock. On the other hand, while the engine travel mode is selected, the electric power supply to the pressure regulating valve 31 is stopped and the switching valve 34 is set to the first state to supply the line pressure PL to the clutch 14, thereby maintaining the engaged state of the clutch 14. While the EV travel mode is selected, the electric power supply to the pressure regulating valve 31 is stopped and the switching valve 34 is set to the second state to stop the oil pressure supply to the clutch 14, thereby maintaining the released state of the clutch 14.

Oil pressure control of the clutch 14 can be similarly performed even by omitting the first oil passage 32 and the switching valve 34 and forming an oil pressure circuit to connect the second oil passage 33 directly to the clutch 14. In this case, the engagement of the clutch 14 is maintained by continuing the electric power supply to the pressure regulating valve 31 so as to output the oil pressure corresponding to the line pressure PL. Unless sensitivity of the output oil pressure of the pressure regulating valve 31 to the electric power supply amount SK to the pressure regulating valve 31 is low, control accuracy of the clutch oil pressure cannot be ensured, and therefore, the electric power supply amount to the pressure regulating valve 31 necessary for maintaining the output oil pressure at the line pressure PL should be set to a somewhat large value. Consequently, if the electric power supply to the pressure regulating valve 31 is continued while the engine travel mode is selected, the electricity consumption becomes a problem.

On the other hand, in the hybrid vehicle of this embodiment, although the control of the clutch oil pressure by the pressure regulating valve 31 is performed at the time of switching transition of the travel mode, it is possible, other than at the time of the switching transition, to stop the electric power supply to the pressure regulating valve 31 of which electricity consumption is large. Note that, also in this case, in order to maintain the engagement of the clutch 14 while the engine travel mode is selected, it is necessary to continue the electric power supply to the solenoid part 34B of the switching valve 34 to maintain the switching valve 34 in the first state. However, the switching valve 34 is configured to only switch between the first state to connect the first oil passage 32 to the clutch 14 and the second state to connect the second oil passage 33 to the clutch 14, in a binary manner in response to the electric power supply or the stoppage of the electric power supply. The electric power supply amount necessary for maintaining the first state of the switching valve 34 is significantly smaller than the electric power supply amount to the pressure regulating valve 31 necessary for maintaining the output of the line pressure PL. Therefore, the electricity consumption in this case is limitative.

In the hybrid vehicle of this embodiment, in the control state S1 for the engine travel mode, the electric power supply to the pressure regulating valve 31 is stopped and the switching valve 34 is set to the first state, thereby supplying the line pressure PL to the clutch 14 to maintain the engaged state of the clutch 14. On the other hand, in the control state S2 for the EV travel mode, the switching valve 34 is set to the second state while the electric power supply to the pressure regulating valve 31 is stopped, thereby stopping the oil pressure supply to the clutch 14 to maintain the released state of the clutch 14. When switching from the engine travel mode to the EV travel mode, the clutch 14 is released while controlling the clutch oil pressure PK by the pressure regulating valve 31 in the state where the second oil passage 33 is connected to the clutch 14.

When the time required for switching from the engine travel mode to the EV travel mode is prolonged so that the stop of the operation of the engine 10 is delayed, the fuel consumption increases corresponding to that required for the operation of the engine 10 during such a delay. Therefore, it is desirable that the switching of the travel mode be performed in a short time. However, if the clutch release control is started simultaneously with the establishment of the engine stop condition without any preparation so as to shorten the switching time of the travel mode, the following problem arises.

Figure 6:
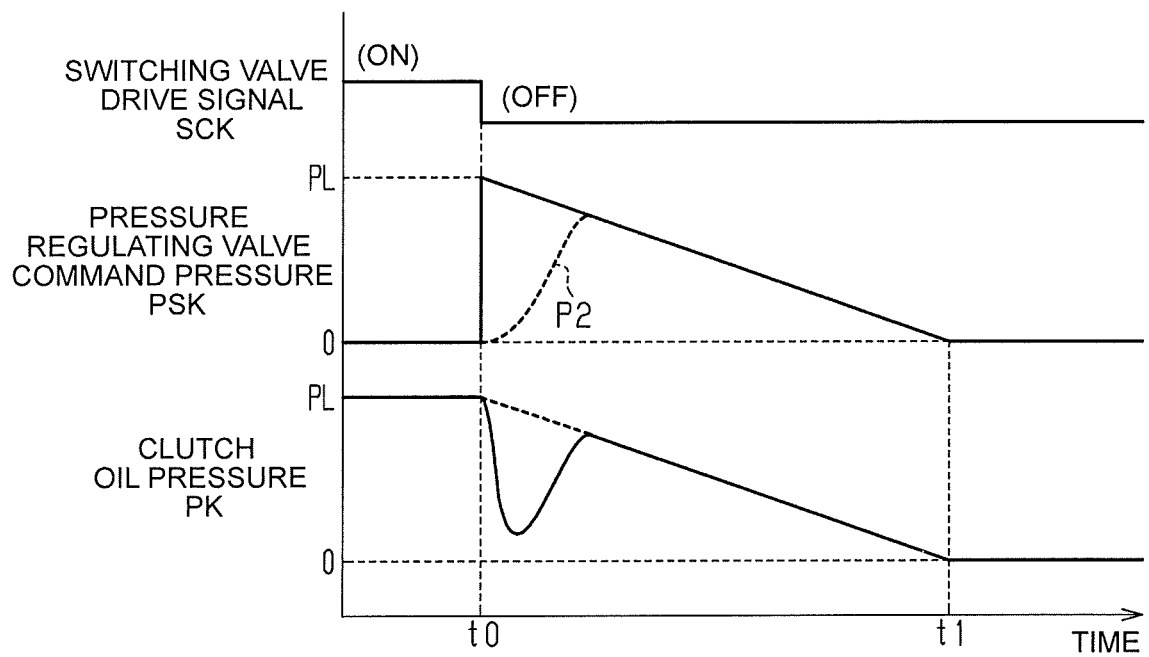
FIG. 6 is a time chart illustrating the manner of control relating to switching of the travel mode when clutch release control is performed by starting electric power supply to a pressure regulating valve simultaneously with switching a switching valve to a second state.

FIG. 6 illustrates changes of the switching valve drive signal SCK, the pressure regulating valve command pressure PSK, and the clutch oil pressure PK when the clutch release control is started simultaneously with the establishment of the engine stop condition. In FIG. 6, at time t0, the shift from the control state S1 for the engine travel mode to the control state S4 is performed. That is, at time t0, the switching valve drive signal SCK is switched from ON to OFF so that the switching valve 34 is switched from the first state to the second state. Simultaneously with this, the pressure regulating valve command pressure PSK is switched from zero to the line pressure PL to start electric power supply to the pressure regulating valve 31. Then, the pressure regulating valve command pressure PSK is gradually decreased from the line pressure PL to zero during a period from time t0 to time t1, thereby performing the clutch release control.

In the control state S1 for the engine travel mode, the switching valve 34 is set to the first state so that the line pressure PL is supplied to the clutch 14 through the first oil passage 32. On the other hand, in the control state S1, since the electric power supply to the pressure regulating valve 31 is stopped, the second oil passage 33 is in a state where the oil pressure is lost (see FIG. 4). Therefore, even by starting the electric power supply to the pressure regulating valve 31 at time t0, as indicated by a dotted line in FIG. 6, it takes some time for the oil pressure P2 of the second oil passage 33 to rise to a value corresponding to the pressure regulating valve command pressure PSK. Consequently, when the second oil passage 33 is connected to the clutch 14 at time t0, the clutch oil pressure PK maintained at the line pressure PL until then rapidly decreases immediately thereafter. As a result, the engagement force of the clutch 14 decreases and therefore the load of the engine 10 decreases, leading to a rapid increase in the engine speed NE. Further, since the power of the engine 10 cannot be fully transmitted to the wheels 13 due to the decrease in the engagement force, there is a possibility of the occurrence of a torque shock.

On the other hand, in this embodiment, the shift from the control state S1 for the engine travel mode to the control state S4 is performed via the control state S3 or the control state S5 to perform the filling control. Further, in this embodiment, while the engine travel mode is selected, the stop prediction process is performed to determine whether or not, although the engine stop condition is currently not established, the possibility is high that the engine stop condition will be established afterwards. Then, when the stop prediction determination is established before the engine stop condition is established, i.e. when the establishment of the engine stop condition can be predicted in advance, the filling control is started at that time point.

Figure 7:
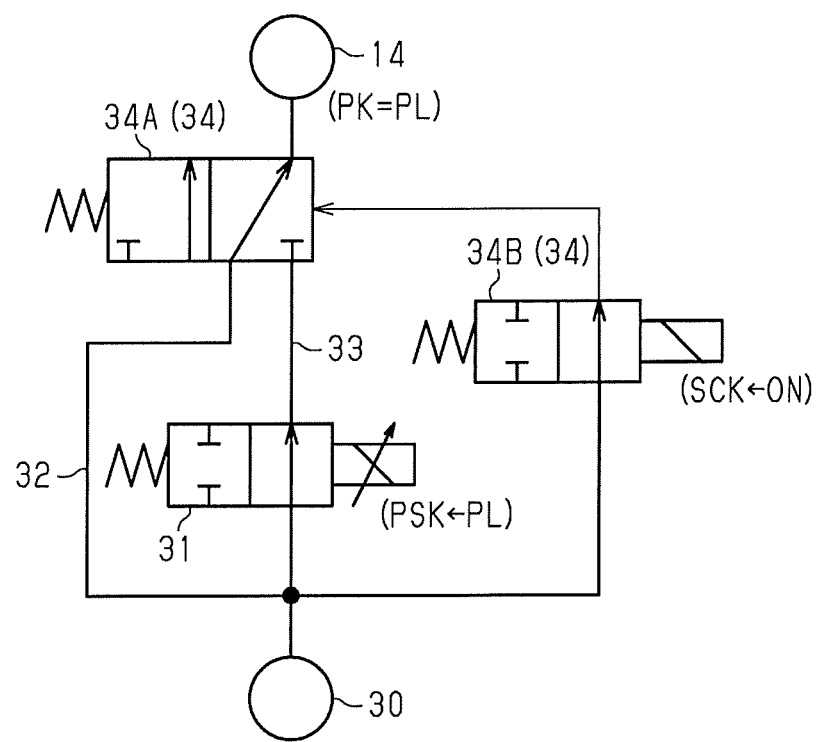
FIG. 7 is a diagram illustrating a state of the oil pressure circuit of the clutch during filling control.

FIG. 7 illustrates a state of the oil pressure circuit of the clutch 14 while the filling control is performed. As illustrated in FIG. 7, during the filling control, the electric power supply to the pressure regulating valve 31 is performed in the state where the switching valve 34 is set to the first state (SCK=ON) and being connected the clutch 14 to the first oil passage 32. Therefore, when the filling control is started, while maintaining the clutch oil pressure PK at the line pressure PL, the oil pressure is introduced from the pressure regulating valve 31 into the second oil passage 33 that is in an oil pressure lost state while the engine travel mode is selected. In this embodiment, since the oil pressure P2 of the second oil passage 33 is increased in advance by the filling control, the decrease in the clutch oil pressure PK is suppressed that otherwise occurs when the second oil passage 33 is connected to the clutch 14 for controlling the clutch oil pressure PK by the pressure regulating valve 31 in the clutch release control.

Figure 8:
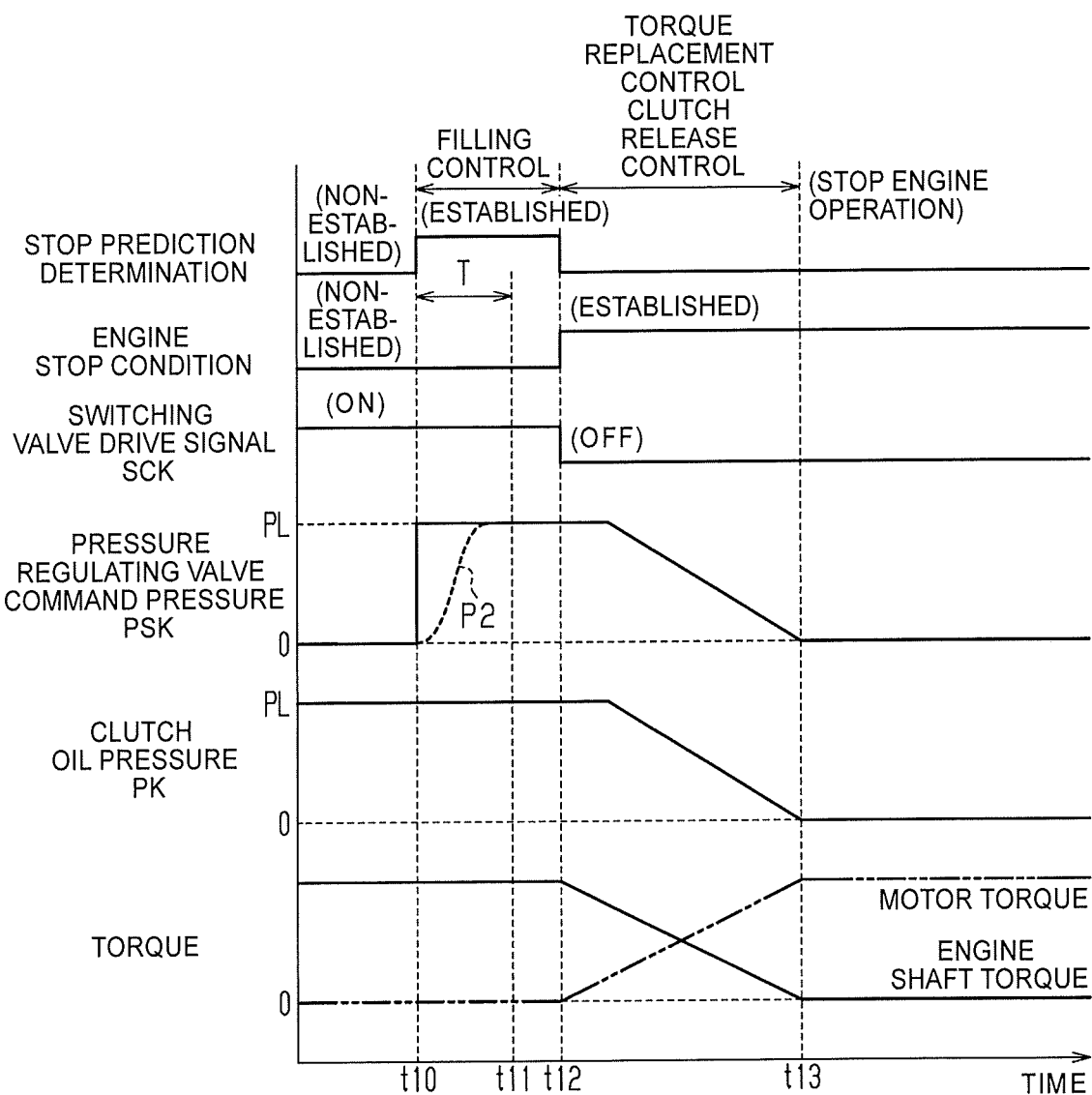
FIG. 8 is a time chart illustrating the manner of control relating to switching of the travel mode when an engine stop condition is established after the establishment of a stop prediction determination in the hybrid vehicle of this embodiment.

FIG. 8 illustrates the transition of control relating to switching of the travel mode when the engine stop condition is established after the establishment of the stop prediction determination in the hybrid vehicle of this embodiment. In FIG. 8, the control state of the vehicle control unit 23 is the control state S1 for the engine travel mode during a period until time t10. That is, during this period, the pressure regulating valve command pressure PSK is set to zero and the switching valve drive signal SCK is set to ON so that the line pressure PL is supplied to the clutch 14 through the first oil passage 32.

When the stop prediction determination is established at time t10, the filling control is started so that while the switching valve drive signal SCK is kept ON, the value of the pressure regulating valve command pressure PSK is switched from zero to the line pressure PL. Consequently, the electric power supply to the pressure regulating valve 31 is started while the first oil passage 32 is connected to the clutch 14. As a result, in the state where the supply of the line pressure PL to the clutch 14 through the first oil passage 32 is maintained, the oil pressure supply to the second oil passage 33 by the pressure regulating valve 31 is started.

In FIG. 8, the engine stop condition is established at time t12 that is later than time t11 at which the pressure increase required time T has elapsed from time t10 and a pressure increase of the second oil passage 33 to the line pressure PL by the filling control is completed. In this case, the switching valve 34 is switched to the second state in response to the establishment of the engine stop condition, thereby shifting to the control state S4. That is, the switching valve drive signal SCK is switched from ON to OFF at time t12 to set the switching valve 34 to the second state, thereby connecting the second oil passage 33 to the clutch 14. Since the oil pressure P2 of the second oil passage 33 in this event is increased to the line pressure PL by the filling control, even when the oil passage to which the clutch 14 is connected is switched to the second oil passage 33, the clutch oil pressure PK is maintained at the line pressure PL.

Thereafter, the clutch release control and the torque replacement control are performed during a period from time t12 to time t13. Then, the operation of the engine 10 is stopped after those controls are completed so that the travel mode is switched to the EV travel mode.

Note that when the engine stop condition is established after the start of the filling control based on the stop prediction determination and before the completion of the pressure increase of the second oil passage 33, the shift to the control state S4 is performed when the pressure increase required time T has elapsed from the start of the filling control so that the pressure increase of the second oil passage 33 is completed. Therefore, even in such a case, it is possible to avoid a situation in which the clutch 14 is connected to the second oil passage 33 in the state where the pressure increase of the second oil passage 33 is insufficient, leading to a decrease in the clutch oil pressure PK.

On the other hand, in this embodiment, when the engine stop condition is established while the stop prediction determination is not established, i.e. when the establishment of the engine stop condition cannot be predicted in advance, the shift to the control state S3 is performed in response to the establishment of the engine stop condition so as to start the filling control. Then, the shift to the control state S4 is performed after the pressure increase of the second oil passage 33 by the filling control is completed, thereby starting the clutch release control and the torque replacement control.

Figure 9:
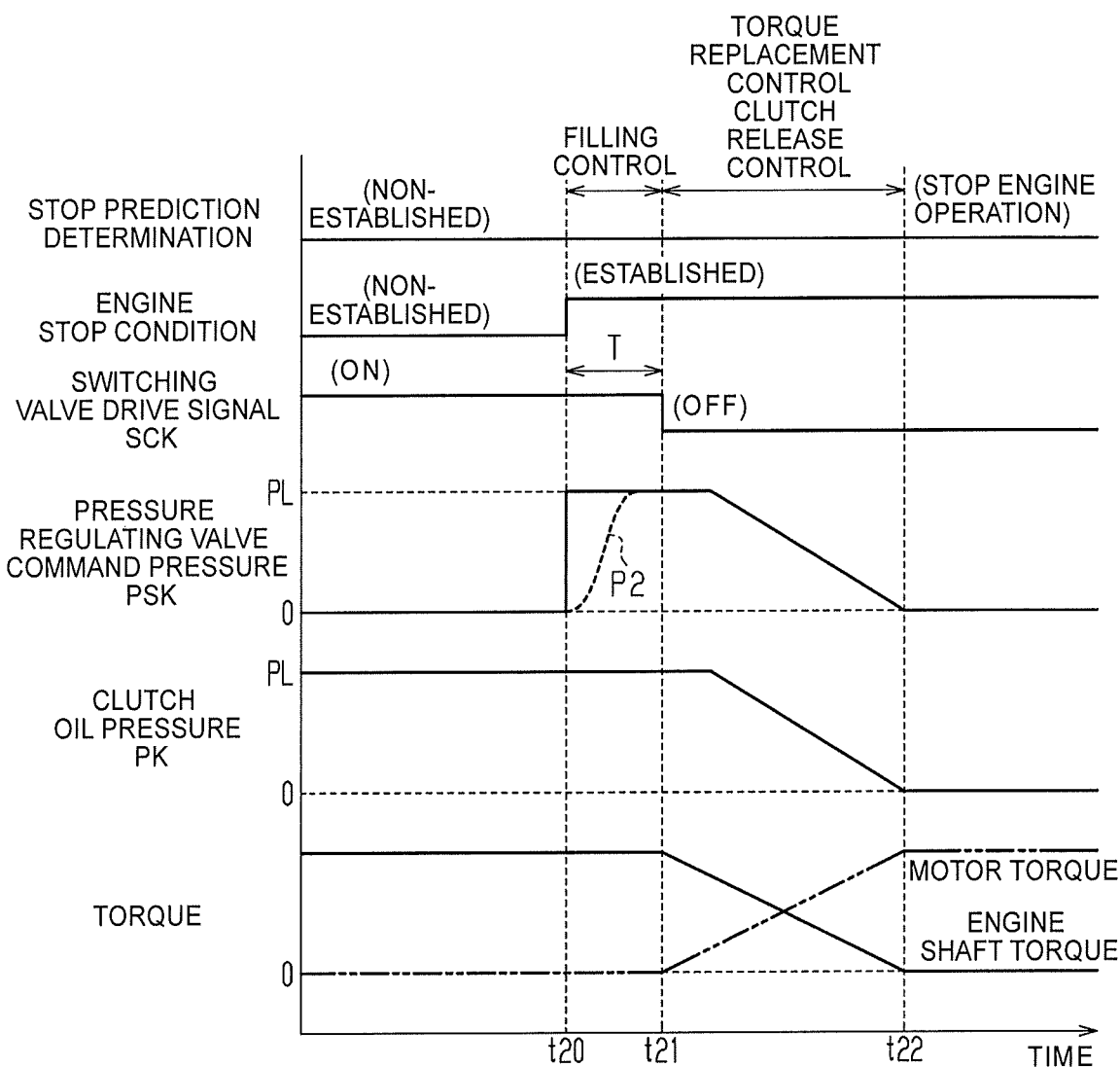
FIG. 9 is a time chart illustrating the manner of control relating to switching of the travel mode when an engine stop condition is established before the establishment of a stop prediction determination in the hybrid vehicle of this embodiment.

FIG. 9 illustrates the transition of control relating to switching of the travel mode in such a case. In FIG. 9, the engine stop condition is established at time t20 in the state where the stop prediction determination is not established. As illustrated in FIG. 9, in this case, at time t20 when the engine stop condition is established, the pressure regulating valve command pressure PSK is switched from zero to the line pressure PL while the switching valve drive signal SCK is kept ON, thereby starting the filling control. Thereafter, at time t21 when the pressure increase required time T has elapsed so that a pressure increase of the second oil passage 33 to the line pressure PL is completed, the switching valve drive signal SCK is switched from ON to OFF so that the second oil passage 33 is connected to the clutch 14. Then, the torque replacement control and the clutch release control are performed during a period from time t21 to time t22. Then, the operation of the engine 10 is stopped after the torque replacement control and the clutch release control are completed so that the travel mode is switched to the EV travel mode. Also in this case, the connection of the second oil passage 33 to the clutch 14 at time t21 is performed in the state where the oil pressure P2 of the second oil passage 33 is increased to the line pressure PL by the filling control. Therefore, also in this case, the clutch release control can be started by switching the switching valve 34 to the second state while maintaining the clutch oil pressure PK at the line pressure PL.

While the start control of the engine 10 is performed when switching from the EV travel mode to the engine travel mode, the clutch oil pressure PK is controlled by the pressure regulating valve 31 in the state where the second oil passage 33 is connected to the clutch 14, and therefore, the second oil passage 33 is in a state where the oil pressure is introduced. Consequently, in this embodiment, when the engine stop condition is established while the start control is performed, the clutch release control is started in response to the establishment of the engine stop condition without performing the filling control, thereby making it possible to quickly stop the operation of the engine 10.

This embodiment can be carried out with the following changes. This embodiment and the following modifications can be carried out in combination within a range in which no technical contradiction occurs.

In the above-described embodiment, the completion of the pressure increase in the oil pressure P2 of the second oil passage 33 by the filling control is determined based on the elapsed time from the start of the filling control. Alternatively, an oil pressure sensor may be disposed in the second oil passage 33 so as to make a determination on the completion of the pressure increase from a detection result of the oil pressure sensor.

The contents of the engine stop condition, the engine start condition, and the establishment condition of the stop prediction determination may be changed as appropriate.

In the above-described embodiment, when switching from the EV travel mode to the engine travel mode, the clutch oil pressure PK is controlled by the pressure regulating valve 31 in the state where the second oil passage 33 is connected to the clutch 14, thereby starting the engine 10 using the power of the motor 15. The start of the engine 10 in this event may be performed in a manner other than that described above. For example, an engine starting motor may be provided in the hybrid vehicle separately from the motor 15, thereby starting the engine 10 using the engine starting motor.

In the above-described embodiment, when the engine stop condition is established in the state where the stop prediction determination is not established, the filling control is started in response to the establishment of the engine stop condition, and the clutch release control is started after the pressure increase in the oil pressure P2 of the second oil passage 33 by the filling control is completed. When it can be said that the engine stop condition will not established in the state where the stop prediction determination is not established, it may be configured that the control corresponding to the control state S3 in FIG. 3 is not incorporated into the control logic of the vehicle control unit 23.

In the above-described embodiment, after the stop prediction determination is established, when the engine stop condition is established in the state where the pressure increase in the oil pressure P2 of the second oil passage 33 by the filling control is not completed, the start of the clutch release control is delayed until the pressure increase in the oil pressure P2 is completed. Even in such a case, the oil pressure P2 of the second oil passage 33 when the engine stop condition is established is increased to some extent. Therefore, even in such a case, when the clutch release control is started by connecting the second oil passage 33 to the clutch 14 in response to the establishment of the engine stop condition, there is an effect of suppressing a decrease in the clutch oil pressure PK at the time of starting the control of the clutch oil pressure PK.

In the above-described embodiment, the pilot type solenoid valve is employed as the switching valve 34. Alternatively, a direct acting type solenoid valve may be employed as the switching valve 34.

In the above-described embodiment, the switching valve 34 is configured to connect the first oil passage 32 to the clutch 14 in response to the electric power supply and to connect the second oil passage 33 to the clutch 14 in response to the stoppage of the electric power supply. Alternatively, the switching valve 34 may be configured to connect the second oil passage 33 to the clutch 14 in response to the electric power supply and to connect the first oil passage 32 to the clutch 14 in response to the stoppage of the electric power supply.

In the above-described embodiment, by performing the torque replacement control, the driving force corresponding to the required driving force is ensured even during switching from the engine travel mode to the EV travel mode. On the other hand, when it is not necessary to ensure the driving force corresponding to the required driving force during switching of the travel mode, such as when switching of the travel mode is performed while the vehicle is stopped, the switching of the travel mode may be performed without performing the torque replacement control.

In the above-described embodiment, the oil pressure generator 30 is configured to generate the line pressure PL serving as the primary pressure for the oil pressure control of the respective hydraulic components of the speed change unit 11. In the case where the oil pressure required for maintaining the engagement of the clutch 14 (the clutch engagement oil pressure) is set to an oil pressure lower than the line pressure PL, the oil pressure generator 30 may be configured to output the oil pressure by lowering the line pressure PL.

What is claimed is:

1. A hybrid vehicle comprising:
   an engine;
   a motor provided in a power transmission path from the engine to a wheel;
   a clutch provided between the engine and the motor in the power transmission path;
   an oil pressure generator configured to generate a clutch engagement oil pressure;
   a pressure regulating valve configured to apply pressure regulation to the clutch engagement oil pressure according to an electric power supply amount and output an oil pressure regulated, the pressure regulating valve configured to stop output of the oil pressure in response to a stoppage of electric power supply;
   a first oil passage serving as an oil passage for supplying the clutch engagement oil pressure generated by the oil pressure generator to the clutch;
   a second oil passage serving as an oil passage for supplying the oil pressure output by the pressure regulating valve to the clutch;
   a switching valve configured to switch between a first state to connect the first oil passage to the clutch and interrupt connection of the second oil passage to the clutch, and a second state to connect the second oil passage to the clutch and interrupt connection of the first oil passage to the clutch; and an electronic control unit configured to perform travel control of the hybrid vehicle by selecting one travel mode from a plurality of travel modes including an engine travel mode in which the hybrid vehicle travels by transmitting power of the engine to the wheel, and an EV travel mode in which the hybrid vehicle travels by power of the motor in a state where the engine is stopped, the electronic control unit configured to switch the travel mode to the EV travel mode when a predetermined engine stop condition is established while the engine travel mode is selected, the electronic control unit configured to, while the EV travel mode is selected, maintain a released state of the clutch by setting the switching valve to the second state in a state where electric power supply to the pressure regulating valve is stopped, and configured to, while the engine travel mode is selected, maintain an engaged state of the clutch by setting the switching valve to the first state in a state where electric power supply to the pressure regulating valve is stopped, the electronic control unit configured to determine whether or not, although the engine stop condition is currently not established, a possibility is high that the engine stop condition will be established afterwards, the electronic control unit configured to perform filling control to supply electric power to the pressure regulating valve to increase the oil pressure in the second oil passage in a state where the switching valve is set to the first state, the electronic control unit configured to perform clutch release control to release the clutch while performing oil pressure control by the pressure regulating valve in a state where the switching valve is set to the second state, and the electronic control unit configured to perform switching from the engine travel mode to the EV travel mode through a first stage to start the filling control when it is determined that the possibility is high that the engine stop condition will be established afterwards while the engine travel mode is selected, a second stage to start the clutch release control by switching the switching valve to the second state in response to establishment of the engine stop condition, and a third stage to stop operation of the engine after completion of the clutch release control.

2. The hybrid vehicle according to claim 1, wherein the electronic control unit is configured to, when the engine stop condition is established before the pressure increase of the second oil passage by the filling control is completed, delay the start of the clutch release control in the second stage until the pressure increase of the second oil passage is completed.

3. The hybrid vehicle according to claim 1, wherein the electronic control unit is configured to, when the clutch release control is started in the second stage, increase motor torque while decreasing shaft torque of the engine.

4. The hybrid vehicle according to claim 1, wherein the electronic control unit is configured to, when the engine stop condition is established in a state where it is not determined that the possibility is high that the engine stop condition will be established afterwards while the engine travel mode is selected, perform switching from the engine travel mode to the EV travel mode through a fourth stage to start the filling control in response to establishment of the engine stop condition, a fifth stage to start the clutch release control by switching the switching valve to the second state in response to completion of the pressure increase of the second oil passage by the filling control, and a sixth stage to stop operation of the engine after completion of the clutch release control.

5. The hybrid vehicle according to claim 1, wherein:
the electronic control unit is configured to, when a predetermined engine start condition is established while the EV travel mode is selected, perform start control to start the engine in a state where the switching valve is set to the second state and electric power is supplied to the pressure regulating valve; and
the electronic control unit is configured to, when the engine stop condition is established while performing the start control, start the clutch release control in response to establishment of the engine stop condition.

* * * * *